(12) United States Patent
Yoo et al.

(10) Patent No.: US 9,092,196 B2
(45) Date of Patent: Jul. 28, 2015

(54) MULTI-PANEL DISPLAY APPARATUS

(71) Applicant: Samsung Display Co., Ltd., Yongin, Gyeonggi-Do (KR)

(72) Inventors: Byung Han Yoo, Seoul (KR); Moongyu Lee, Suwon-si (KR); Hyeonggyu Jang, Busan (KR); Byoungho Cheong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 112 days.

(21) Appl. No.: 13/842,457

(22) Filed: Mar. 15, 2013

(65) Prior Publication Data

US 2014/0145910 A1     May 29, 2014

(30) Foreign Application Priority Data

Nov. 28, 2012   (KR) .......................... 10-2012-0136330

(51) Int. Cl.
   *G06F 1/16*    (2006.01)
   *G06F 3/14*    (2006.01)

(52) U.S. Cl.
   CPC ............ *G06F 1/1641* (2013.01); *G06F 3/1446* (2013.01); *G09G 2300/026* (2013.01); *G09G 2370/18* (2013.01)

(58) Field of Classification Search
   None
   See application file for complete search history.

(56) References Cited

U.S. PATENT DOCUMENTS

| 5,572,034 | A  | 11/1996 | Karellas |
| 6,892,011 | B2 | 5/2005  | Walker et al. |
| 7,239,367 | B2 | 7/2007  | Jin et al. |
| 7,592,971 | B2 | 9/2009  | Chang et al. |
| 2011/0134150 | A1* | 6/2011 | Imamura ..................... 345/690 |
| 2011/0310128 | A1  | 12/2011 | Han |

FOREIGN PATENT DOCUMENTS

| JP | 2001-134203 | 5/2001 |
| JP | 2002-229485 | 8/2002 |
| KR | 10-2001-0082824 | 8/2001 |
| KR | 10-2003-0088835 | 11/2003 |
| KR | 10-2004-0050433 | 6/2004 |
| KR | 10-2009-0089727 | 8/2009 |

* cited by examiner

*Primary Examiner* — Joseph Haley
(74) *Attorney, Agent, or Firm* — Innovation Counsel LLP

(57) ABSTRACT

A display apparatus includes a first display panel. The first display panel includes a first display area and a first non-display area. The first display area includes a first pixel part and a second pixel part. The second pixel part is configured to display a first image. The display apparatus further includes a second display panel. The second display panel includes a second display area and a second non-display area. The second display area including a third pixel part and a fourth pixel part. The fourth pixel part is configured to display a second image. The display apparatus further includes an optical member. The optical member includes a first set of optical units and a second set of optical units. The first set of optical units is connected to the second set of optical units. The first set of optical units is connected to the second pixel part for displaying a third image, the third image corresponding to the first image. The second set of optical units is connected to the fourth pixel part for displaying a fourth image, the fourth image corresponding to the second image.

18 Claims, 11 Drawing Sheets

MULTI-PANEL DISPLAY APPARATUS

CROSS-REFERENCE TO RELATED APPLICATION

This U.S. non-provisional patent application claims priority to and benefit of Korean Patent Application No. 10-2012-0136330, filed on Nov. 28, 2012, the contents of which are incorporated herein by reference in their entirety.

BACKGROUND

1. Field of the Invention

The present invention relates to a display apparatus. More particularly, the present invention relates to a multi-panel display apparatus.

2. Description of the Related Art

Some display apparatus applications, such as commercial image display apparatuses installed on building rooftops, electronic notice display apparatuses installed in a sports complexes, live broadcast display apparatus used in concerts, etc. may require large display sizes. In general, display devices having large screens may be associated with several advantages, such as high manufacturing costs and unsatisfactory image quality (which may be caused by signal-propagation delay). For avoiding the disadvantages, a large-scale display apparatus may be implemented using a plurality of display panels, wherein each of the display panels may display an image portion of a large image. Nevertheless, the edge portions of the display panels may not be able to display images. As a result, the displayed image portions may be disconnected, and the displayed large image may not be continuous.

SUMMARY

One or more embodiments of the invention may be related to a display apparatus that may include a first display panel. The first display panel may include a first display area and a first non-display area. The first display area may include a first pixel part and a second pixel part. The second pixel part may be configured to display a first image. The display apparatus may further include a second display panel. The second display panel may include a second display area and a second non-display area. The second display area may include a third pixel part and a fourth pixel part. The fourth pixel part may be configured to display a second image. The display apparatus may further include an optical member. The optical member may include a first set of optical units and a second set of optical units, the first set of optical units being connected to the second set of optical units. The first set of optical units may be connected to the second pixel part for displaying a third image, wherein the third image may correspond to the first image. The second set of optical units may be connected to the fourth pixel part for displaying a fourth image, wherein the fourth image may correspond to the second image. The optical member may advantageously prevent image discontinuity and/or perceived image distortion at (and/or near) the boundary between the first display panel and the second display panel.

In one or more embodiments, the third image is a widened version of the first image.

In one or more embodiments, the first pixel part includes a first plurality of pixels, the second pixel part includes a second plurality of pixels, and each pixel of the first plurality of pixels is larger than a pixel of the second plurality of pixels.

In one or more embodiments, the second pixel part includes a plurality of pixels, and each optical unit of the first set of optical units is connected to one pixel of the plurality of pixels for displaying an image portion corresponding to the one pixel of the plurality of pixels.

In one or more embodiments, the second pixel part and the fourth pixel part are disposed between the first pixel part and the third pixel part.

In one or more embodiments, the first non-display area and the second non-display area are disposed between the second pixel part and the fourth pixel part.

In one or more embodiments, the second pixel part is disposed between the first pixel part and the first non-display area.

In one or more embodiments, the first set of optical units overlaps both the second pixel part and the first non-display area.

In one or more embodiments, the first set of optical units includes a first optical unit and a second optical unit, the first optical unit is disclosed closer to the first pixel part than the second optical unit, and the first optical unit is shorter than the second optical unit.

In one or more embodiments, the first optical unit overlaps the second pixel part without overlapping the first non-display area, and the second optical unit overlaps both the second pixel part and the first non-display area.

In one or more embodiments, the first optical unit includes a first end surface and a second end surface, the first end surface is substantially parallel to a display surface of the first display area, and the second end surface is larger than the first end surface and is disposed at a first acute angle with respect to the display surface of the first display area.

In one or more embodiments, the first optical unit further includes a reflecting surface connected to both the first end surface and the second end surface.

In one or more embodiments, the second optical unit includes a third end surface and a fourth end surface, the third end surface is substantially parallel to the display surface of the first display area, the fourth end surface is disposed at a second acute angle with respect to the display surface of the first display area, and the second acute angle is smaller than the first acute angle.

In one or more embodiments, an area of the first end surface is equal to an area of the third end surface.

In one or more embodiments, the second end surface is smaller than the fourth end surface.

In one or more embodiments, the second pixel part includes a plurality of pixels, each optical unit of the first set of optical units includes an end surface that corresponds to one pixel of the plurality of pixels, and a size of the end surface is substantially equal to a size of each pixel of the plurality of pixels.

In one or more embodiments, the first set of optical units includes at least one of a plurality of optical fibers and a plurality of optical sheets.

One or more embodiments of the invention may be related to method for manufacturing a display apparatus. The method may include the following steps: providing a cylinder; disposing a plurality of optical units on the cylinder such that the plurality of optical units conform to a curved surface of the cylinder; cutting the plurality of optical units to form an optical member that has a first end and a second end; attaching the first end to a first display panel; and attaching the second end to a second display panel. The optical member may advantageously prevent image discontinuity and/or perceived image distortion at (and/or near) the boundary between the first display panel and the second display panel.

In one or more embodiments, the cutting the plurality of optical units includes cutting the plurality of optical units along a geometric plane that includes geometric axes of cross sections of the cylinder and along a geometric curved surface that overlaps the curved surface of the cylinder and is wider than the curved surface of the cylinder.

In one or more embodiments, the method may include cutting the cylinder along a geometric plane that includes geometric axes of cross sections of the cylinder when cutting the plurality of optical units along the geometric plane.

In one or more embodiments, a width of the first end is equal to a width of a pixel part of a display area of the first display panel.

In one or more embodiments, a surface area of the first end is equal to a surface area of a pixel part of a display area of the first display panel.

One or more embodiments of the invention may be related to a multi-panel display apparatus capable of displaying a large-scale image with satisfactory display quality.

One or more embodiments of the invention may be related to a display apparatus that includes a plurality of display panels each including a display area in which an image is displayed and a non-display area disposed adjacent to at least one side of the display area. The display apparatus may further include an optical member that displays the image provided from a portion of the display area on the non-display area. The optical member may include a first end portion connected to a portion of the display area. The optical member may further include a second end portion, at least a portion of which may be disposed on the non-display area between the display areas.

In one or more embodiments, each of the display areas includes a plurality of pixels, and the optical member corresponds to a portion of the pixels.

In one or more embodiments, each of the display areas includes a main pixel part and a peripheral pixel part disposed between the main pixel part and the non-display area and connected to the optical member, and each pixel provided in the main pixel part has an area larger than an area of each pixel provided in the peripheral pixel part.

In one or more embodiments, the optical member is an optical fiber bundle.

The optical fiber bundle includes a plurality of optical fibers corresponding to the pixels of the peripheral pixel part in a one-to-one correspondence, the second end portion of the optical fiber bundle includes a plurality of end surfaces inclined with respect to a geometric axis (and/or a longitudinal direction) of the optical fibers, and each of the end surfaces has an area that approximates or equals the area of each pixel of the main pixel part.

In one or more embodiments, the optical member is an optical sheet bundle that includes a stack of optical sheets each having a (curved) plate shape. The optical sheets of the optical sheet bundle correspond to the pixels of the peripheral pixel part, which are arranged along the non-display area and are arranged between the main pixel part and the non-display area.

According to embodiments of the invention, the image displayed at (and/or near) a boundary between display panels may be prevented from being disconnected and/or from being conspicuously distorted. Advantageously, embodiments of the invention may enable displaying large-scale images with satisfactory display quality using relatively small display panels without using relatively high-cost large display panels.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
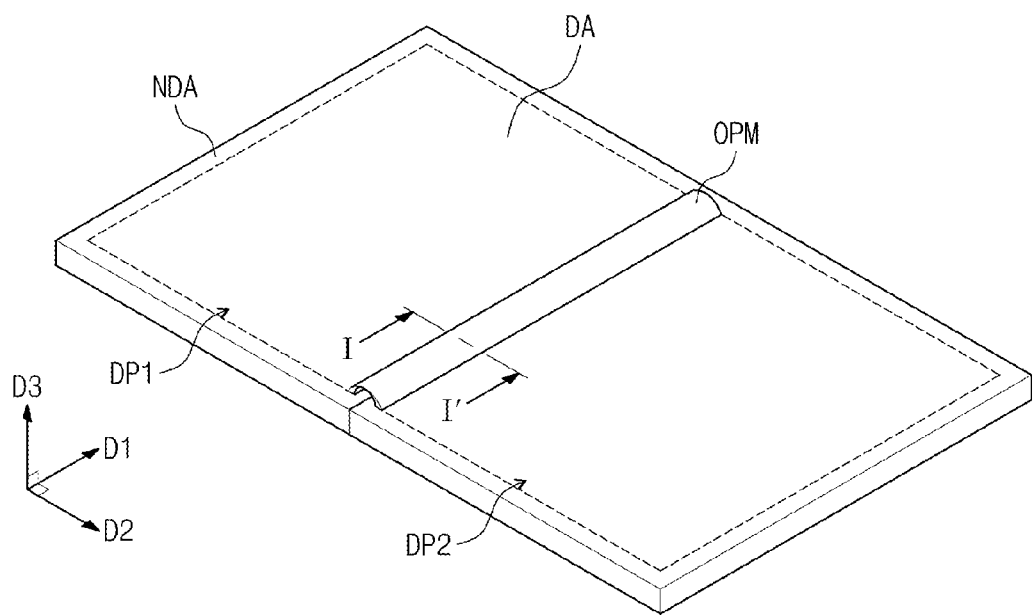
FIG. 1 is a perspective view illustrating a display apparatus according to one or more embodiments of the present invention.

In the specification, when an element or layer is referred to as being "on", "connected to", or "coupled to" another element or layer, it can be directly on, directly connected, or directly coupled to the other element or layer, or intervening elements or layers may be present. In contrast, when an element is referred to as being "directly on", "directly connected to", or "directly coupled to" another element or layer, there are no intervening elements or layers (except possible environmental elements, such as air) present. Like numbers may refer to like elements in the specification. As used herein, the term "and/or" may include any and all combinations of one or more of the associated listed items.

Although the terms first, second, etc. may be used herein to describe various elements, components, regions, layers and/or sections, these elements, components, regions, layers and/or sections should not be limited by these terms. These terms may be used to distinguish one element, component, region, layer or section from another region, layer or section. Thus, a first element, component, region, layer or section discussed below could be termed a second element, component, region, layer or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

Spatially relative terms, such as "beneath", "below", "lower", "above", "upper", etc., may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments and is not intended to be limiting of the invention. As used herein, the singular forms, "a", "an" and "the" may include the plural forms as well, unless the context clearly indicates otherwise. The terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
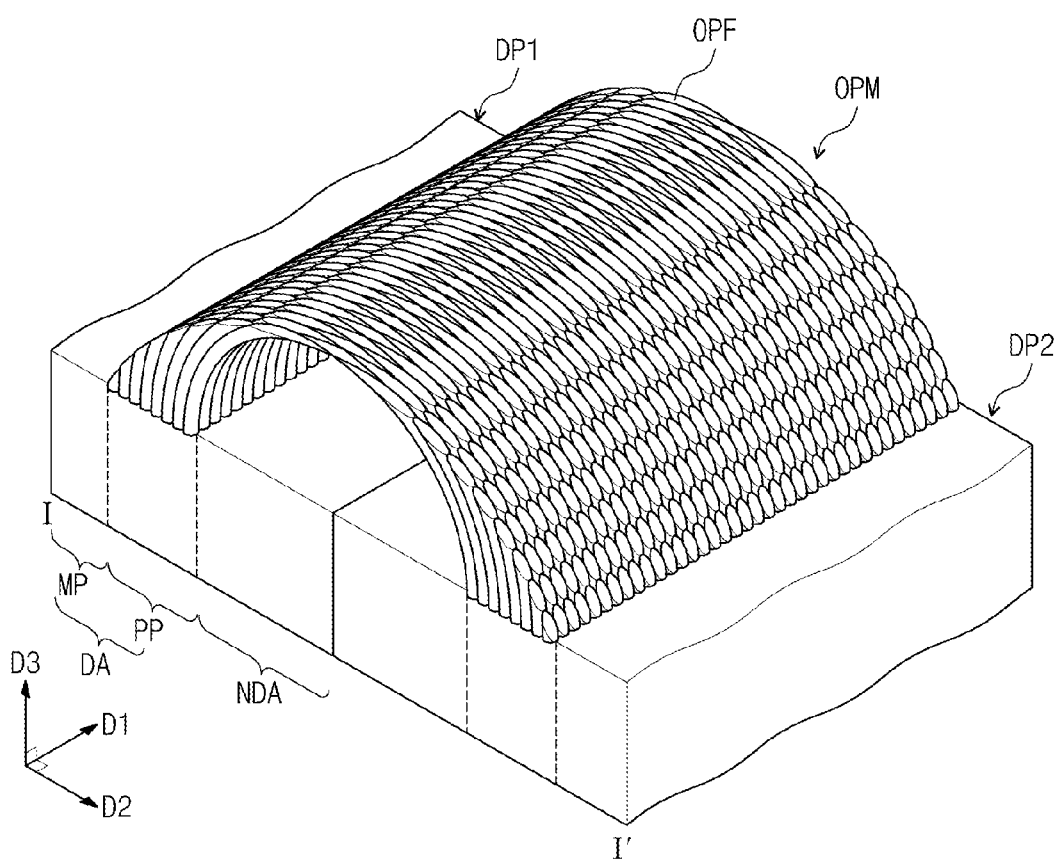
FIG. 2 is a perspective view taken along a line I-I' indicated in FIG. 1 and illustrating a portion of the display apparatus of FIG. 1 according to one or more embodiments of the present invention.
Figure 3:
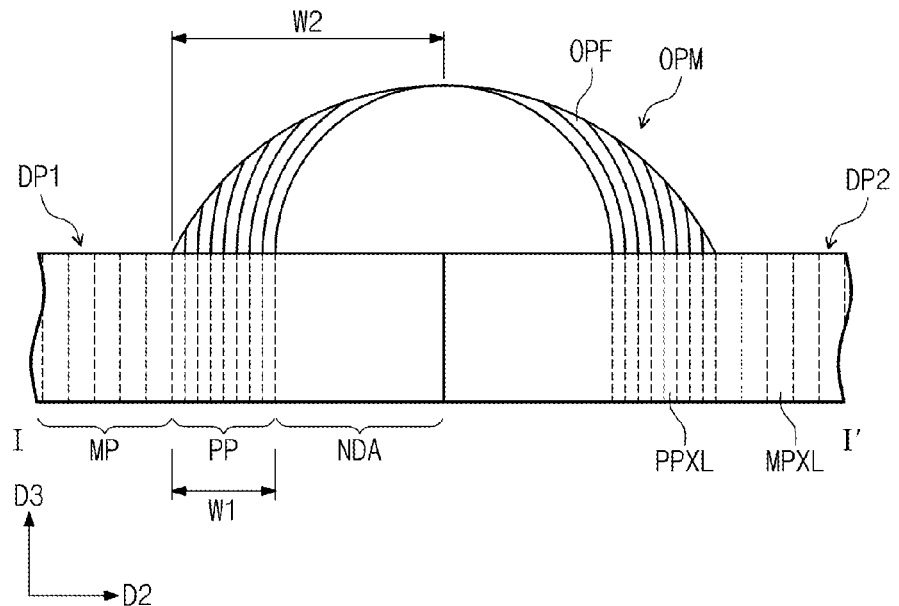
FIG. 3 is a cross-sectional view taken along the line I-I' indicated in FIG. 1 according to one or more embodiments of the present invention.

FIG. 1 is a perspective view illustrating a display apparatus according to one or more embodiments of the present invention. FIG. 2 is a perspective view taken along a line I-I' indicated in FIG. 1 and illustrating a portion of the display apparatus of FIG. 1 according to one or more embodiments of the present invention. FIG. 3 is a cross-sectional view taken along the line I-I' indicated in FIG. 1 according to one or more embodiments of the present invention.

Referring to FIGS. 1 to 3, the display apparatus includes display panels in which an image is displayed and an optical member OPM disposed between the display panels and connected to the display panels. In one or more embodiments, two display panels connected to each other in a second direction D2. In one or more embodiments, the number of the display panels may be greater than two. For the convenience of explanation, the two display panels may be referred to as a first display panel DP1 and a second display panel DP2, respectively.

The display panels DP1 and DP2 are disposed on a same plane or on a same curved or bent surface. The display panels DP1 and DP2 are rigid or flexible.

Each of the display panels DP1 and DP2 may be used to display an image. Each of the display panels DP1 and DP2 may include an organic light emitting display panel, a liquid crystal display panel, an electrowetting display panel, an electrophoretic display panel, a microelectromechanical system display panel, or a plasma display panel.

In one or more embodiments, each of the display panels DP1 and DP2 may be a liquid crystal display panel that includes a base substrate, an opposite substrate overlapping the base substrate, and a liquid crystal layer disposed between the base substrate and the opposite substrate. In one or more embodiments, the base substrate includes a plurality of pixel electrodes and a plurality of thin film transistors connected to the pixel electrodes in a one-to-one correspondence. Each thin film transistor of the thin film transistors may control transmission of a driving signal applied to a corresponding pixel electrode of the pixel electrodes. The opposite substrate includes a common electrode that may form an electric field in cooperation with the pixel electrodes to control an arrangement of liquid crystal molecules of the liquid crystal layer, for controlling the images displayed by the display panel.

In one or more embodiments, the display panels DP1 and DP2 may be a same kind of display panel. In one or more embodiments, the display panels DP1 and DP2 may be different kinds of display panels. In one or more embodiments, the size of the display panel DP1 may be equal to the size of the display panel DP2. In one or more embodiments, the size of the display panel DP1 may be different from the size of the display panel DP2. In one or more embodiments, the shape of the display panel DP1 may be different from the shape of the display panel DP2.

The display panels DP1 and DP2 have a predetermined thickness. In one or more embodiments, each of the display panels DP1 and DP2 has the rectangular plate shape having a pair of long sides and a pair of short sides, wherein each of the short sides is shorter than each of the long sides. A direction in which the long sides extend may be referred to as a first direction D1, a direction in which the short sides extend may be referred to as the second direction D2, and a direction vertical to the directions D1 and D2, in which the image is displayed (i.e., in which the light associated with the image is transmitted), may be referred to as a third direction D3.

The display panels DP1 and DP2 may be disposed adjacent to each other in the second direction D2 such that side surfaces of the display panels DP1 and DP2 may contact each other. In one or more embodiment, the display panels DP1 and DP2 may directly contact each other such that no space (or gap) exists between the display panels DP1 and DP2. In one or more embodiments, the display panels DP1 and DP2 are spaced apart from each other, and a spacer or a connection member (not shown) may be disposed between the display panels DP1 and DP2.

Each of the display panels DP1 and DP2 includes a display area DA in which an image may be displayed and a non-display area NDA that may not display an image. The non-display area NDA may surround the display area DA. In one or more embodiments, the non-display area NDA may be covered by a covering element, e.g., a top cover, a top chassis, or a bezel. In one or more embodiments, the covering element may have a rectangular ring shape, may cover the non-display area NDA, and may expose the display area DA.

The display area DA includes a main pixel part MP and a peripheral pixel part PP disposed adjacent to the main pixel part MP. The main pixel part MP includes a plurality of main pixels MPXL; the peripheral pixel part PP includes a plurality of peripheral pixels PPXL. Each pixel of the pixels includes a pixel electrode and a thin film transistor connected to the pixel electrode, and the pixel electrode may cooperate with a corresponding portion of the common electrode to forms an electric field in a corresponding portion of the liquid crystal layer, thereby controlling an image displayed by the pixel. The peripheral pixel part PP may extend in the first direction D1 along the non-display area NDA of the display panel. The peripheral pixel part PP of the first display panel DP1 and the non-display panel NDA of the first display panel DP1 may be disposed between the main pixel part MP of the first display panel DP1 and the non-display panel NDA of the second display panel DP2. The peripheral pixel part PP of the first display panel DP1 may be disposed between the main pixel part MP of the first display panel DP1 and the non-display panel NDA of the first display panel DP1. The non-display panel NDA of the first display panel DP1 may be disposed between the peripheral pixel part PP of the first display panel DP1 and the non-display panel NDA of the second display panel DP2. The peripheral pixel part PP of the second display panel DP2 and the non-display panel NDA of the second display panel DP2 may be disposed between the main pixel part MP of the second display panel DP2 and the non-display panel NDA of the first display panel DP1. The peripheral pixel part PP of the second display panel DP2 may be disposed between the main pixel part MP of the second display panel DP2 and the non-display panel NDA of the second display panel DP2. The non-display panel NDA of the second display panel DP2 may be disposed between the peripheral pixel part PP of the second display panel DP2 and the non-display panel NDA of the first display panel DP1. The optical member OPM is disposed on (and overlaps) the peripheral pixel part PP and at least a portion of the non-display area NDA. The optical member OPM may display an image, i.e., a portion of the image displayed by the display apparatus. In one or more embodiments, the optical member OPM may not overlap the main pixel part MP in the third direction D3.

In one or more embodiments, the optical member OPM includes an optical fiber bundle that includes a plurality of optical fibers OPF.

Figure 4:
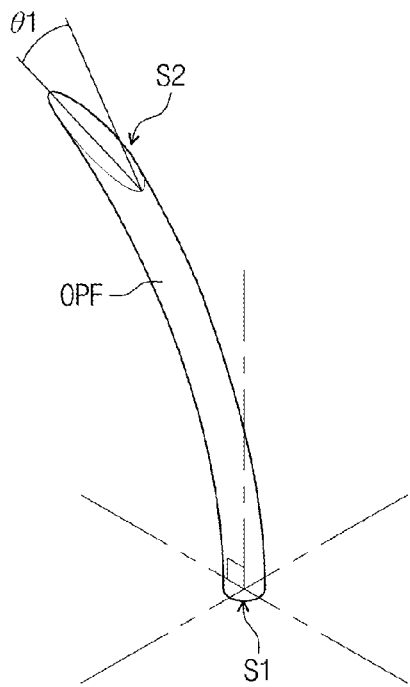
FIG. 4 is a perspective view illustrating one optical fiber of an optical fiber bundle according to one or more embodiments of the present invention.

FIG. 4 is a perspective view illustrating one optical fiber OPF of the optical fiber bundle according to one or more embodiments of the present invention.

Referring to FIG. 4, the optical fiber OPF includes a first end S1 vertically cut with respect to a geometric axis of the optical fiber OPF (which is consistent with a direction in which the optical fiber OPF extends) and a second end S2 obliquely cut at a predetermined angle θ1 with respect to the geometric axis of the optical fiber OPF. The first end S1 may have a cut surface (or end surface) oriented perpendicular to the third direction D3. The cut surface (or end surface) of the second end S2 (which may be elliptical) may have a larger geometric axis and a larger area than the cut surface (or end surface) of the first end S1 (which may be circular). Accordingly, when the image having a first area is provided to the first end S1 of the optical fiber OPF, the image having a second area wider than the first area is displayed through the second end S2 of the optical fiber OPF.

Referring to FIGS. 1 to 4 again, the first end S1 of the optical fiber OPF is (directly) connected to a peripheral pixel part PP of a display area DA; analogously, the first ends S1 of other optical fibers OPF of the optical fiber bundle are connected to a peripheral pixel part of a display area DA. In one or more embodiments, the first end of a portion of the optical fiber bundle, which includes the first ends S1 of a first set of optical fibers OPF, e.g., a left half of the optical fiber bundle illustrated in FIG. 3, is (directly or through an adhesive) connected to the peripheral pixel part PP of the first display panel DP1; the first end of a remaining portion of the optical fiber bundle, which includes the first ends S1 of a second set of optical fibers OPF, e.g., a right half of the optical fiber bundle illustrated in FIG. 3, is connected to the peripheral pixel part PP of the second display panel DP2. The first set of optical fibers OPF of the optical fiber bundle may protrude from the first display panel DP1; the second set of optical fibers OPF of the optical fiber bundle may protrude from the second display panel DP2. In one or more embodiments, the optical fibers OPF may correspond to the peripheral pixels PPXL of the peripheral pixel part PP in a one-to-one correspondence; i.e., each of the optical fibers OPF may display an image displayed by one peripheral pixel PPXL.

In one or more embodiments of the invention, an adhesive is provided between the optical fibers OPF of the optical fiber bundle to prevent the optical fibers OPF from moving.

In each of the display panels DP1 and DP2, the optical fiber bundle is distributed on (and overlaps) the peripheral pixel part PP and the non-display area NDA. In one or more embodiments, the first ends S1 of the first set of optical fibers OPF of the optical fiber bundle may be substantially vertically connected to the peripheral pixel part PP of the first display panel DP1, and the second ends S2 of the first set of optical fibers OPF of the optical fiber bundle may be distributed on (and may overlap) the peripheral pixel part PP of the first display panel DP1 and the non-display area NDA of the first display panel DP1, which is disposed adjacent to the second display panel DP2. The first ends S1 of the second set of optical fibers OPF of the optical fiber bundle may be substantially vertically connected to the peripheral pixel part PP of the second display panel DP2, and the second ends S2 of the second set of optical fibers OPF of the optical fiber bundle may be distributed on (and may overlap) the peripheral pixel part PP of the second display panel DP2 and the non-display area NDA of the second display panel DP2, which is disposed adjacent to the first display panel DP1. In one or more embodiments, the first set of optical fibers OPF of the optical fiber bundle, which overlaps the non-display area NDA of the first display panel DP1 in the third direction D3, and the second set of optical fibers OPF of the optical fiber bundle, which overlaps the non-display area NDA of the second display panel DP2 in the third direction D3, may be symmetrical with each other with respect to a midpoint between the first display panel DP1 and the second display panel DP2. The first set of optical fibers may include a first optical fiber and a second optical fiber. The first optical fiber may be disposed closer to the main pixel part MP of the first display panel DP1 than the second optical fiber and may be shorter than the second optical fiber. The first cut surface of the first optical fiber may be as large as the first cut surface of the second optical fiber; the second cut surface of the first optical fiber may be smaller than the second cut surface of the second optical fiber. The first optical fiber may overlap the peripheral pixel part PP of the first display panel DP1 without overlapping the non-display area NDA of the first display panel DP1 in the third direction D3; the second optical fiber may overlap both the peripheral pixel part PP of the first display panel DP1 and the non-display area NDA of the first display panel DP1 in the third direction D3. The second set of optical fibers may include a third optical fiber and a fourth optical fiber. The third optical fiber may be disposed closer to the main pixel part MP of the second display panel DP2 than the fourth optical fiber and may be shorter than the fourth optical fiber. The second optical fiber and the fourth optical fiber may be disposed between the first optical fiber and the third optical fiber.

The optical fiber bundle may be spaced from the non-display areas NDA of the display panels DP1 and DP2. In one or more embodiments, a space between the optical fiber bundle and the non-display areas NDA of the display panels DP1 and DP2 is empty. In one or more embodiments, a support member may be provided in the space between the optical fiber bundle and the non-display areas NDA to stably support the optical fiber bundle. The support member may have a semi-circular column shape or a semi-elliptical column shape.

In one or more embodiments of the invention, a width of the peripheral pixel part PP of the first display panel DP1 in the second direction D2 is referred to as a first width W1, a combined width of the peripheral pixel part PP of the first display panel DP1 and the non-display area NDA of the first display panel DP1 in the second direction D2 is referred to as a second width W2, the combined cross section of the first ends S1 of the first set of optical fibers of the optical fiber bundle connected to the first display panel DP1 has an area corresponding to the first width W1, and the combined cross section of the second ends S2 of the first set of optical fibers of the optical fiber bundle connected to the first display panel DP1 has an area corresponding to the second width W2 when projected in the third direction D3. The second set of optical fibers of the optical fiber bundle may have an analogous configuration mirroring the configuration of the first set of optical fibers of the optical fiber bundle.

Each of the cut surfaces of the second ends S2 of the optical fibers of the optical fiber bundle may represent one pixel to display an image portion in the third direction D3. In one or more embodiments, the cut surfaces of the second ends S2 of the optical fibers OPF may not have a uniform area, but the area of the cut surface of the second end S2 of an optical fiber OPF projected in the third direction D3 may approximate or equal the area of a main pixel MPXL of the main pixel part MP. In one or more embodiments, the area of the cut surface of the second end S2 of each optical fiber OPF projected in the third direction D3 may approximate or equal the area of one main pixel MPXL of the main pixel part MP. In one or more embodiments, each peripheral pixel PPXL of the peripheral pixel part PP has an area smaller than an area of each main pixel MPXL of the main pixel part MP given that the cut surface of the first end S1 of each optical fiber OPF (corresponding to the area a peripheral pixel PPXL) may be smaller than the cut surface of the second end S2 of the optical fiber OPF (projected in the third direction D3 to approximate or equal the area of a main pixel MPXL). In one or more embodiments, the areas of the cut surfaces projected in the third direction D3 may be controlled by inclining and/or bending the optical fibers OPF toward the non-display area NDA from the peripheral pixel part PP and cutting the second end S2 of each optical fiber OPF to form a cut surface that is oblique with respect to the geometric axis (and/or the extension direction) of the optical fiber OPF.

In one or more embodiments, although areas of main pixels MPXL may be different from areas of cut surfaces of some optical fibers OPF projected in the third direction D3, and although the areas of the cut surfaces of the second ends S2 of the optical fibers OPF projected in the third direction D3 may not be uniform, substantially no defects may be perceived by the viewer since the area covered by the optical fiber bundle may be very small in comparison with the combined area of the display panels DP1 and DP2. In one or more embodiments, the pixel size difference caused by the differences between the main pixel MPXL size and the peripheral pixel PPXL size, caused by the differences between the main pixel MPXL size and the projected areas of the cut surfaces of the second end S2 of the optical fibers OPF, caused by the non-uniformity of the peripheral pixel PPXL sizes, and/or caused by the non-uniformity of the projected areas of the cut surfaces of the second end S2 of the optical fibers OPF may be compensated by a circuit design.

In one or more embodiments of the invention, the cut surfaces of the second ends S2 of the optical fibers OPF may form a curved surface that protrudes from the front surface of the display panels DP1 and DP2 and extends between the boundary of the main pixel part MP and the peripheral pixel part PP of the first display panel DP1 and the boundary of the main pixel part MP and the peripheral pixel part PP of the second display panel DP2. The cut surfaces of the second ends S2 of the optical fibers OPF disposed along the curved surface may have different areas according to the position of the corresponding pixels of the peripheral pixel part PP.

In one or more embodiments, the display panels DP1 and DP2 may be synchronized with each other to collectively display one image. In one or more embodiments, the display panels DP1 and DP2 may respectively display different images.

Embodiments of the invention may advantageously prevent the image displayed by the display panels DP1 and DP2 from being disconnected and/or from being substantially distorted at (or near) the boundary between the display panels DP1 and DP2. Since the non-display areas NDA between the display areas DA of the display panels DP1 and DP2 are covered by the cut surfaces of the second ends S2 of the optical fibers OPF to display images, the non-display areas NDA may not be perceived by the viewer, and thus the image displayed in each display panel is connected to the image displayed in an adjacent display panel.

Figure 5A:
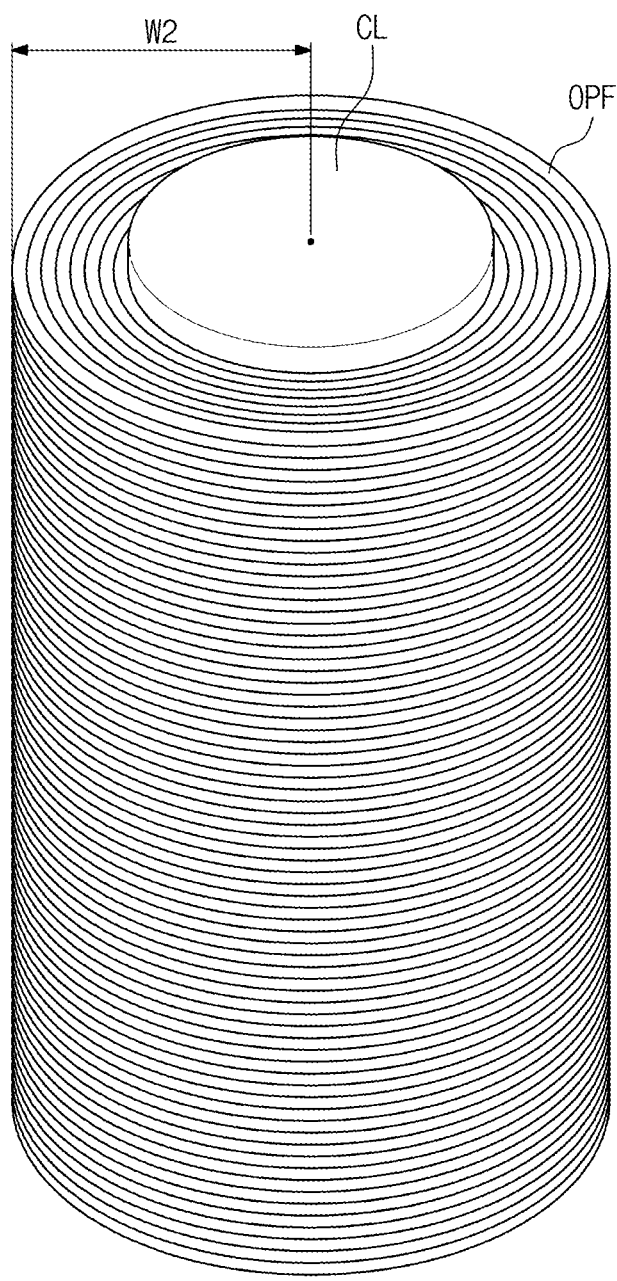
FIGS. 5A to 5C are perspective views illustrating a method of manufacturing an optical member according to one or more embodiments of the present invention.
Figure 5B:
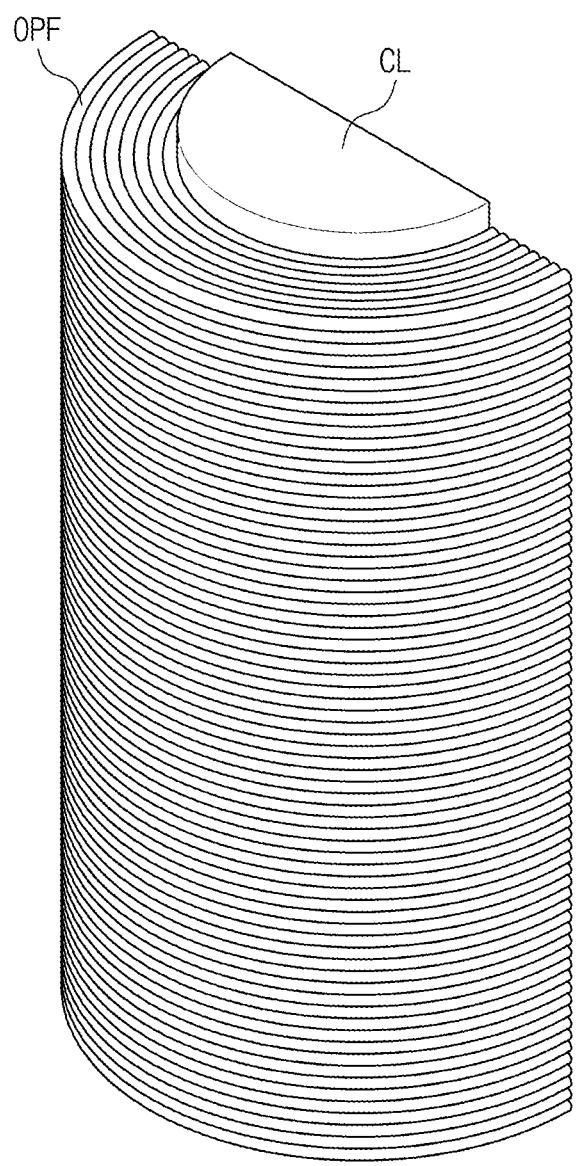
Figure 5C:
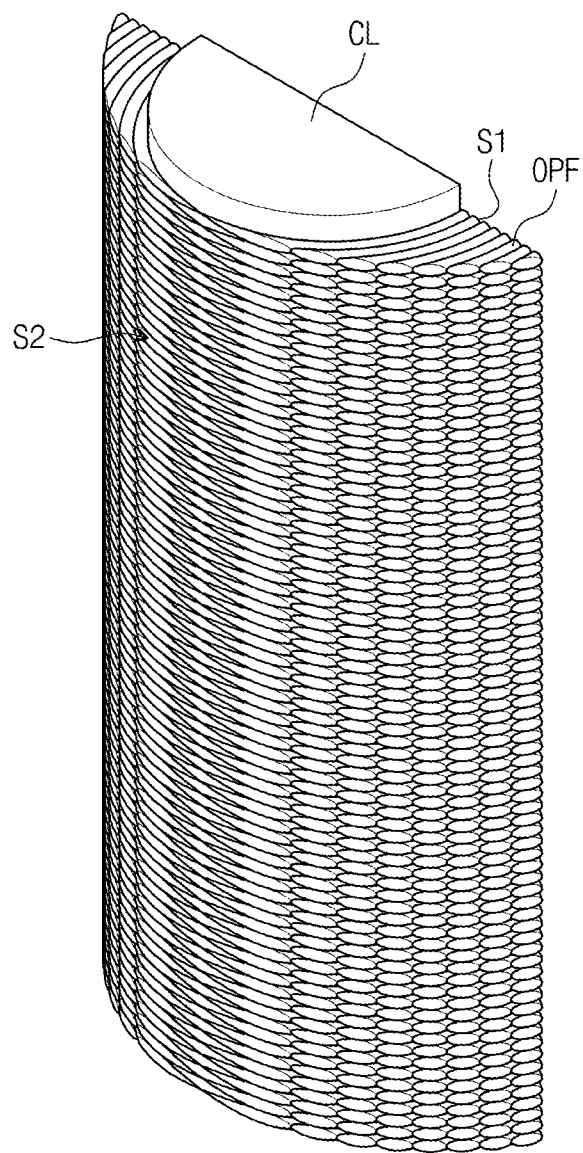

FIGS. 5A to 5C are perspective views illustrating a method of manufacturing the optical member, i.e., the optical fiber bundle, according to one or more embodiments of the present invention.

Referring to FIG. 5A, a cylinder CL is prepared to manufacture the optical fiber bundle. The cylinder CL has a cross section that is of a circular shape or an elliptical shape and is vertical to a longitudinal geometric axis of the cylinder CL. In one or more embodiments, the cross section of the cylinder CL has the circular shape, and the diameter of the circular shape is substantially equal to a sum of the widths of the non-display areas NDA between the display area DA of the first display panel DP1 and the display area DA of the second display panel DP2. In one or more embodiments, the radius of the circular shape is substantially equal to the width of a non-display area NDA. In one or more embodiments, the cross section of the cylinder CL has the elliptical shape, and the length of a long axis or short axis of the elliptical shape is substantially equal to the sum of the widths of the non-display areas NDA between the display area DA of the first display panel DP1 and the display area DA of the second display panel DP2. In one or more embodiments, the length of the long axis or short axis of the elliptical shape is substantially equal to the width of a non-display area NDA.

Optical fibers OPF are wound around the cylinder CL to form an optical fiber bundle that has a thickness corresponding to the first width W1, i.e., the width of the peripheral pixel part PP of a display panel. The cylinder CL wound with the optical fiber bundle may become an enlarged cylinder having a radius that is equal to the second width W2, i.e., the sum of the width of a peripheral pixel area PP and the width of a non-display area NDA.

As illustrated in FIG. 5B, the optical fiber bundle is cut to have a shape suitable for connection with the display panels DP1 and DP2. In one or more embodiments, the cylinder CL may be cut together with the optical fiber bundle.

The optical fiber bundle is cut to have the cut surface of the first end S1 of each optical fiber OPF oriented vertical to the geometric axis of the optical fiber OPF and/or vertical to the direction in which the optical fiber OPF extends. In one or more embodiments, the cross section of the cylinder CL has the circular shape, and the cylinder CL and the optical fiber bundle are cut along the geometric axis of the cylinder CL (and/or the extension direction of the cylinder CL) to allow the cutting line to pass through a center of the circular shape and/or to coincide a diameter of the circular shape. In one or more embodiments, the cross section of the cylinder CL has the elliptical shape, the cylinder CL and the optical fiber bundle are cut along the geometric axis of the cylinder CL (and/or the extension direction of the cylinder CL) to allow the cutting line to coincide with the long axis or short axis of the cross section of the cylinder CL, which is set to have a length equal to the width of the non-display area NDA.

Referring to FIG. 5C, the optical fiber bundle is cut to have the cut surface of the second end S2 of each optical fiber OPF inclined with respect to the geometric axis of the optical fiber OPF and/or with respect to the extension direction of the optical fiber OPF.

In one or more embodiments, the cross section of the cylinder CL has the circular shape, and the optical fiber bundle may be cut such that the cut surfaces of the second end S2 of the optical fibers OPF may form a half an (imaginary) elliptical cylinder that has an elliptical cross section perpendicular to a geometric axis of the elliptical cylinder and/or an extension direction of the elliptical cylinder. The long axis of the elliptical cross section may coincide with a diameter (or a maximum width) of the pre-cut optical fiber bundle and/or may coincide with the cutting line that passes through the center of a circular cross section of the cylinder CL; the short axis of the elliptical cross section may coincide with the diameter of the circular cross section of the cylinder CL. In one or more embodiments, the cross section of the cylinder CL has the elliptical shape, the cylinder CL may be referred to as a first elliptical cylinder CL that has a first elliptical cross section, and the optical fiber bundle may be cut such that the cut surfaces of the second end S2 of the optical fibers OPF may form a half a second elliptical cylinder (which is an imaginary elliptical cylinder) that has a second elliptical cross section perpendicular to a geometric axis of the second elliptical cylinder and/or an extension direction of the second elliptical cylinder. The long axis of the second elliptical cross section may coincide with a first axis (or a maximum width) of the pre-cut optical fiber bundle and/or may coincide with the cutting line that passes through the center of a first elliptical cross section of the first elliptical cylinder CL; the short axis of the elliptical cross section may coincide with a second axis of the first elliptical cross section of the first elliptical cylinder CL.

After the cutting, the resulted optical fiber bundle may be attached to the peripheral pixel part PP of each of the display panels DP1 and DP2. In one or more embodiments, the optical fiber bundle may be attached to the peripheral pixel part PP after the cylinder CL has been removed. In one or more embodiments, the optical fiber bundle may be attached to the peripheral pixel part PP together with the cylinder CL, and the cylinder CL may be used as the support member to support the optical fiber bundle.

In one or more embodiment of the invention, a transparent adhesive is disposed between the upper surface of the peripheral pixel part PP of each of the display panels DP1 and DP2 and the cut surfaces of the first ends S1 of the optical fibers OPF of the optical fiber bundle so as to attach the optical fiber bundle to the peripheral pixel part PP. In one or more embodiments, an adhesive (e.g., the same type of transparent adhesive) is provided between the optical fibers OPF of the optical fiber bundle to prevent the optical fibers OPF from moving with respect to each other.

Figure 6:
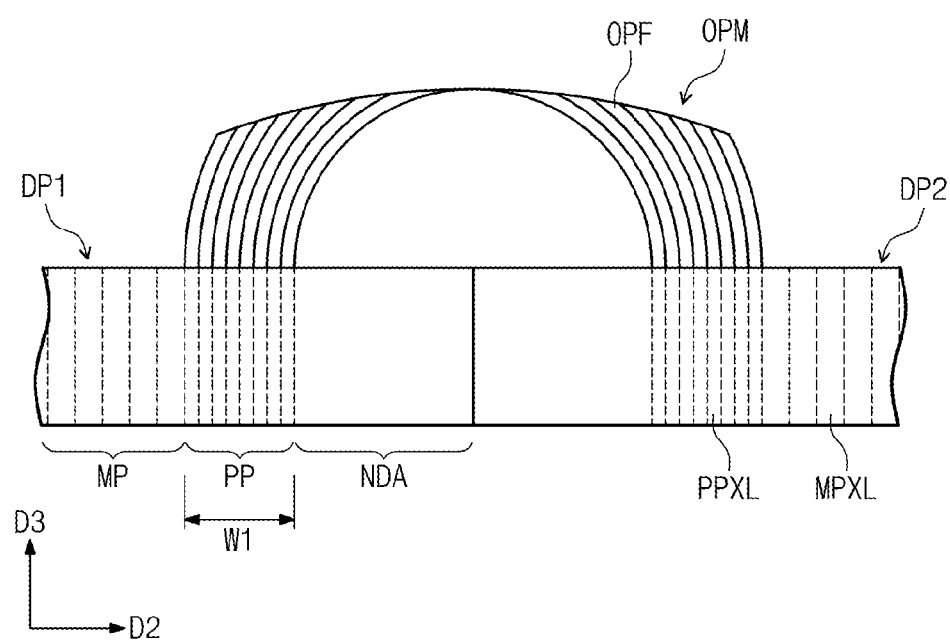
FIG. 6 is a cross-sectional view illustrating an optical member according to one or more embodiments of the present invention.

In one or more embodiments, the optical member may be formed by cutting optical fibers or cutting an optical fiber bundle that may be attached to a body or a column that may have a non-circular and non-elliptical cross section, such a column having a semicircular cross section or a column having a semielliptical cross section. FIG. 6 is a cross-sectional view illustrating an optical member according to one or more embodiments of the present invention.

Referring to FIG. 6, the inclined angles of the optical fiber bundle, the inclined angles of the cut surfaces of the second ends of the optical fibers of the optical fiber bundle may be configured according particular embodiments, and the area of the cut surfaces of the second ends of the optical fibers of the optical fiber bundle may be configured according particular embodiments. The size of each of the pixels perceived by the viewer through the optical fiber bundle may substantially approximate or equal the size of a main pixel MPXL of the main pixel part MP. In one or more embodiments, as illustrated in FIG. 6, the cut surface of the first end S1 of an optical fiber OPF disposed at a boundary between a main pixel part MP and a peripheral pixel part PP of a same display panel may be spaced from the cut surface of the second end S2 of the optical fiber OPF. In one or more embodiments, as illustrated in FIG. 3, the cut surface of the first end S1 of an optical fiber OPF disposed at a boundary between a main pixel part MP and a peripheral pixel part PP of a same display panel may be substantially directly connected to the cut surface of the second end S2 of the optical fiber OPF.

Figure 7:
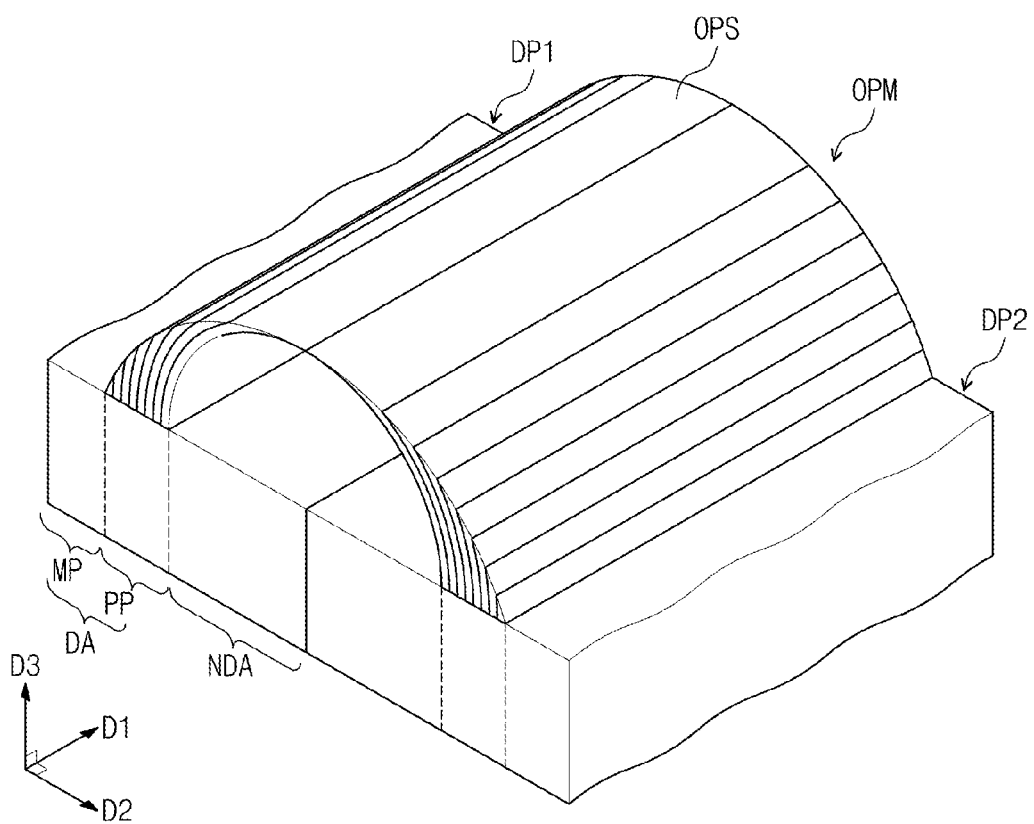
FIG. 7 is a perspective view taken along a line I-I' indicated in FIG. 1 and illustrating a portion of the display apparatus of FIG. 1 according to one or more embodiments of the present invention.
Figure 8:
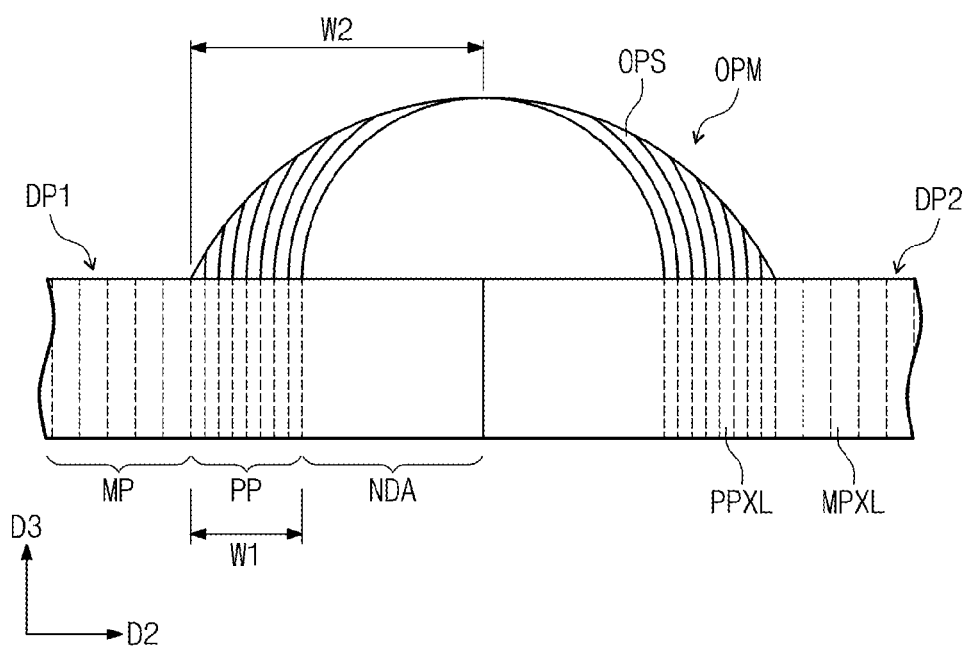
FIG. 8 is a cross-sectional view taken along a line I-I' indicated in FIG. 1 according to one or more embodiments of the present invention.

FIG. 7 is a perspective view taken along a line I-I' indicated in FIG. 1 and illustrating a portion of the display apparatus of FIG. 1 according to one or more embodiments of the present invention. FIG. 8 is a cross-sectional view taken along a line I-I' indicated in FIG. 1 according to one or more embodiments of the present invention. In FIGS. 7 and 8, the same reference numerals may denote the same elements and/or analogous elements illustrated in FIGS. 2 to 4. Detailed descriptions of the same elements and/or analogous elements may be omitted.

Referring to FIGS. 1, 7, and 8, the display apparatus includes a first display panel DP1, a second display panel DP2, and an optical member OPM. Each of the display panels DP1 and DP2 includes a display area DA and a non-display area NDA. The display area DA includes a main pixel part MP, which includes main pixels MPXL, and a peripheral pixel part PP, which includes peripheral pixels PPXL.

In tone or more embodiments, the optical member OPM includes an optical sheet bundle. The optical sheet bundle may include a stack of optical sheets OPS each having a plate shape. The optical sheets OPS may extend in a direction in which the non-display area NDA extends, i.e., the first direction D1.

Each optical sheet OPS of the optical sheet bundle may include one or more (coated) reflecting surfaces, e.g., an inner surface and an outer surface disposed farther from the non-display areas NDS than the inner surface, to continuously reflect the image (or light) incident into the optical sheet OPS and may include a substantially transparent surface for displaying the image (i.e., transmitting the light) through the substantially transparent surface. The optical sheet bundle may protrude from the display panels DP1 and DP2 and the image is displayed in the third direction D3.

Figure 9:
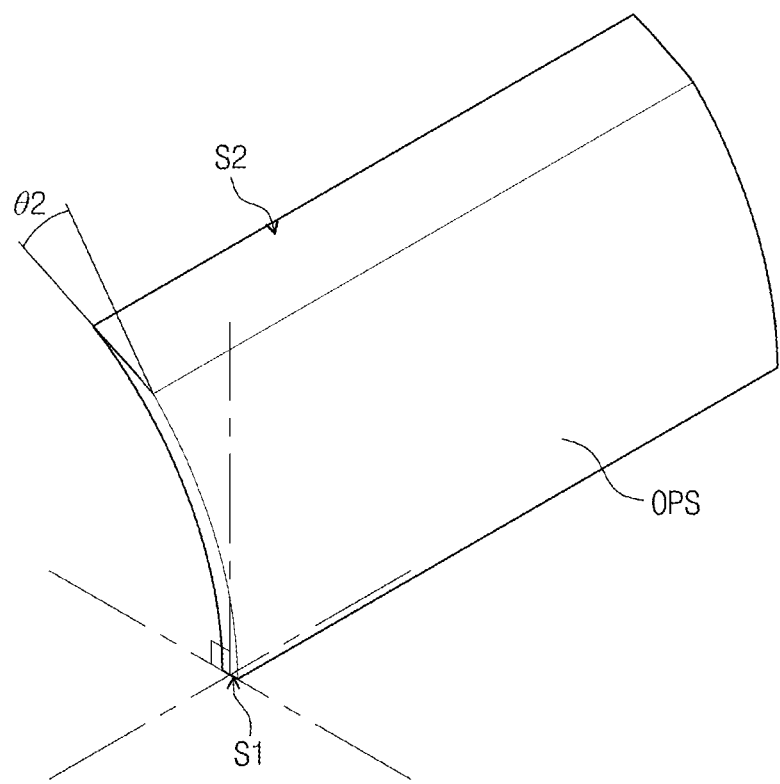
FIG. 9 is a perspective view illustrating one optical sheet of an optical sheet bundle according to one or more embodiments of the present invention.

FIG. 9 is a perspective view illustrating one optical sheet of the optical sheet bundle according to one or more embodiments of the present invention.

Referring to FIG. 7 and FIG. 9, the optical sheet OPS may extend in the first direction D1. As illustrated in FIG. 8 and FIG. 3, a cross section of the optical sheet OPS perpendicular to the first direction D1 may have a shape analogous to a cross section of an optical fiber OPF perpendicular to the first direction D1. A first end S1 of the optical sheet OPS may have a cut surface (or end surface) that is substantially perpendicular to a tangent at a junction of the cut surface and an outer surface of the optical sheet OPS. A second end S2 of the optical sheet OPS may have an inclined cut surface (or inclined end surface) that is inclined at an angle θ2 with respect to a tangent at a junction of the inclined cut surface and an outer surface of the optical sheet OPS. The inclined cut surface of the second end S2 has a width wider than a width of the cut surface of the first end S1. The inclined cut surface of the second end may be a substantially transparent surface for displaying an image. In one or more embodiments, an image having a first area may be provided to the cut surfaces of the first ends S1 of the optical sheets OPS of the optical sheet bundle, and the image may be enlarged (to have a second area larger than the first area) and displayed at the inclined cut surfaces of the second ends S2 of the optical sheets OPS of the optical sheet bundle.

Referring to FIGS. 1, 7, and 8, the cut surfaces (or end surfaces) of the first end S1 of the optical sheets OPS of the optical sheet bundle may be (substantially directly or through an adhesive) connected to the peripheral pixel part PP of the display area DA of each of the display panels DP1 and DP2. In one or more embodiments, the first end of a portion of the optical sheet bundle, which includes the first ends S1 of a first set of optical sheets OPS, e.g., a left half of the optical fiber bundle illustrated in FIG. 8, is connected to the peripheral pixel part PP of the first display panel DP1; the first end of a remaining portion of the optical sheet bundle, which includes the first ends S1 of a second set of optical sheets OPS, e.g., a right half of the optical fiber bundle illustrated in FIG. 8, is connected to the peripheral pixel part PP of the second display panel DP2. In one or more embodiments, the optical sheets OPS may correspond to the peripheral pixels PPXL of the peripheral display part PP in a one-to-one correspondence; i.e., each of the optical sheet OPS may display an image displayed by one peripheral pixel PPXL. In one or more embodiments, each of the peripheral pixel parts PPXL may extend in the first direction D1.

The optical sheet bundle is distributed on (and overlaps) the peripheral pixel part PP and the non-display area NDA. In one or more embodiments, the first ends S1 of the first set of optical sheets OPS of the optical sheet bundle may be substantially vertically connected to the peripheral pixel part PP of the first display panel DP1, and the second ends S2 of the first set of optical sheets OPS of the optical sheet bundle may be distributed on (and may overlap) the peripheral pixel part PP of the first display panel DP1 and the non-display area NDA of the first display panel DP1, which is disposed adjacent to the second display panel DP2. The first ends S1 of the second set of optical sheets OPS of the optical sheet bundle may be substantially vertically connected to the peripheral pixel part PP of the second display panel DP2, and the second ends S2 of the second set of optical sheets OPS of the optical sheet bundle may be distributed on (and may overlap) the peripheral pixel part PP of the second display panel DP2 and the non-display area NDA of the second display panel DP2, which is disposed adjacent to the first display panel DP1. In one or more embodiments, the first set of optical sheets OPS of the optical sheet bundle, which overlaps the non-display area NDA of the first display panel DP1 in the third direction D3, and the second set of optical sheets OPS of the optical sheet bundle, which overlaps the non-display area NDA of the second display panel DP2 in the third direction D3, may be symmetrical with each other with respect to a midpoint between the first display panel DP1 and the second display panel DP2. The first set of optical sheets may include a first optical sheet and a second optical sheet. The first optical sheet may be disposed closer to the main pixel part MP of the first display panel DP1 than the second optical sheet and may be shorter than the second optical sheet. The cut surface of the first end S1 of the first optical sheet may be as large as the cut surface of the first end S1 of the second optical sheet; the inclined cut surface of the second end S2 of the first optical sheet may be smaller than the inclined cut surface of the second end S2 of the second optical sheet. The first optical sheet may overlap the peripheral pixel part PP of the first display panel DP1 without overlapping the non-display area NDA of the first display panel DP1 in the third direction D3; the second optical sheet may overlap both the peripheral pixel part PP of the first display panel DP1 and the non-display area NDA of the first display panel DP1 in the third direction D3. The second set of optical sheets may include a third optical sheet and a fourth optical sheet. The third optical sheet may be disposed closer to the main pixel part MP of the second display panel DP2 than the fourth optical sheet and may be shorter than the fourth optical sheet. The second optical sheet and the fourth optical sheet may be disposed between the first optical sheet and the third optical sheet.

The optical sheet bundle may be spaced from the non-display areas NDA of the display panels DP1 and DP2. In the one or more embodiments, a space between the optical sheet bundle and the non-display areas NDA of the display panels DP1 and DP2 is empty. In one or more embodiments, a support member may be provided in the space between the optical sheet bundle and the non-display areas NDA to stably support the optical sheet bundle. The support member may have a semi-circular column shape or a semi-elliptical column shape.

In one or more embodiments of the invention, a width of the peripheral pixel part PP of the first display panel DP1 in the second direction D2 is referred to as a first width W1, a combined width of the peripheral pixel part PP of the first display panel DP1 and the non-display area NDA of the first display panel DP1 in the second direction D2 is referred to as a second width W2, the combined cross section of the first ends S1 of the first set of optical sheets of the optical sheet bundle connected to the first display panel DP1 has an area corresponding to the first width W1, and the combined cross section of the second ends S2 of the first set of optical sheets of the optical sheet bundle connected to the first display panel DP1 has an area corresponding to the second width W2 when projected in the third direction D3. The second set of optical sheets of the optical sheet bundle may have an analogous configuration mirroring the configuration of the first set of optical sheets of the optical sheet bundle.

In one or more embodiments of the invention, the inclined cut surfaces of the second ends S2 of the optical sheets OPS may form a curved surface that protrudes from the front surface of the display panels DP1 and DP2 and extends between the boundary of the main pixel part MP and the peripheral pixel part PP of the first display panel DP1 and the boundary of the main pixel part MP and the peripheral pixel part PP of the second display panel DP2. The cut surfaces of the second ends S2 of the optical sheets OPS disposed along the curved surface may have different areas according to the corresponding position of the pixels of the peripheral pixel part PP.

In one or more embodiments, the display panels DP1 and DP2 may be synchronized with each other to collectively display one image. In one or more embodiments, the first and second display panels DP1 and DP2 may respectively display different images.

Embodiments of the invention may advantageously prevent the image displayed by the display panels DP1 and DP2 from being disconnected and/or from being substantially distorted at (or near) the boundary between the display panels DP1 and DP2. Since the non-display areas NDA between the display areas DA of the display panels DP1 and DP2 are covered by the cut surfaces of the second ends S2 of the optical sheets OPS to display images, the non-display areas NDA may not be perceived by the viewer, and thus the image displayed in each display panel is connected to the image displayed in an adjacent display panel.

The method of manufacturing the optical sheet bundle may be substantially as analogous to the method of manufacturing the optical fiber bundle described with reference to FIGS. 5A to 5C.

In one or more embodiments of the invention, a transparent adhesive is disposed between the upper surface of the peripheral pixel part PP of each of the display panels DP1 and DP2 and the cut surfaces of the first ends S1 of the optical sheets OPS of the optical sheet bundle so as to attach the optical sheet bundle to the peripheral pixel part PP. In one or more embodiments, an adhesive (e.g., the same type of transparent adhesive) is provided between the optical sheets OPS of the optical sheet bundle to prevent the optical sheets OPS from moving with respect to each other.

The optical sheet bundle is attached to the peripheral pixel part PP of each of the display panels DP1 and DP2.

Figure 10:
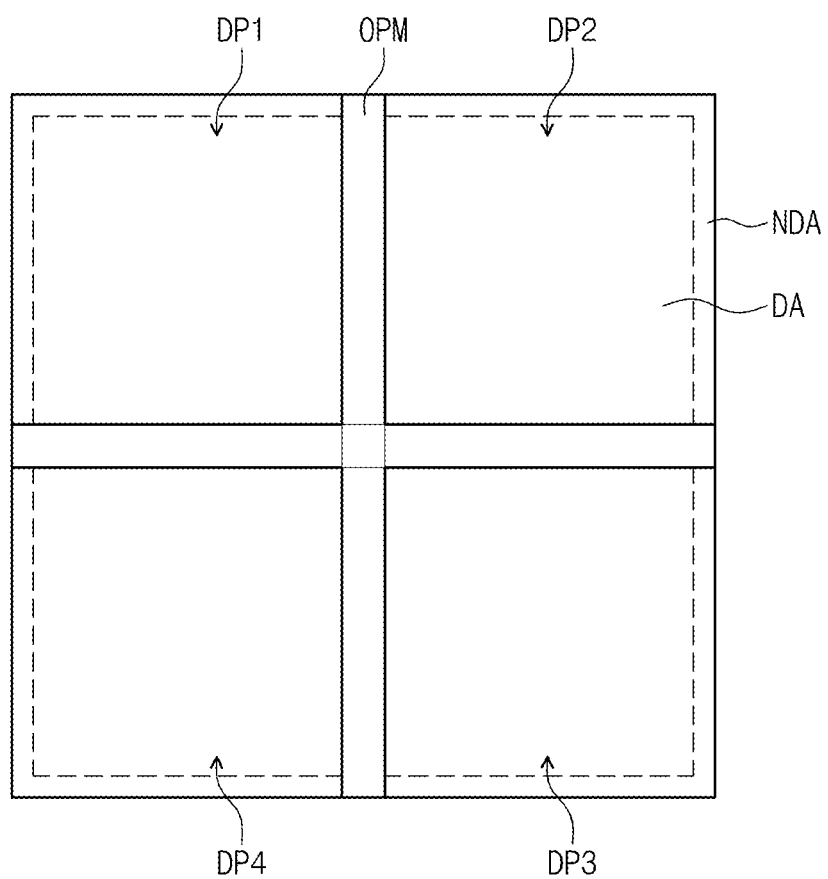
FIG. 10 is a plan view illustrating a display apparatus according to one or more embodiments of the present invention.

FIG. 10 is a plan view illustrating a display apparatus according to one or more embodiments of the present invention.

Referring to FIG. 10, the display apparatus includes a plurality of display panels, e.g., display panels DP1, DP2, DP3, and DP4, which are arranged in a matrix form of two rows by two columns. Each of the display panels DP1, DP2, DP3, and DP4 includes a display area DA and a non-display area NDA, and an optical member OPM is disposed between each pair of the display panels DP1, DP2, DP3, and DP4. The optical member OPM is connected to a portion of the display panel DA of each of the display panels and covers the non-display areas NDA between the display areas of each pair of the display panels DP1, DP2, DP3, and DP4.

In one or more embodiments, the display panels may be arranged in one or more of various matrix forms. For instance, the display panels DP1, DP2, DP3, and DP4 may be arranged in one row by four columns or four rows by one column. In one or more embodiments, nine display panels may be provided and may be arranged in three rows by three columns. In one more embodiments, immediately neighboring display panels of the display panels may be connected to optical members for displaying images associated with peripheral pixel parts.

As can be appreciated from the foregoing description, embodiments of the invention may prevent images displayed at (and/or near) boundaries of display panels from being disconnected and/or from being substantially distorted. Advantageously, large-scale images may be display with substantially satisfactory display quality using multiple display panels without requiring a high-cost large display panel.

Although the embodiments of the present invention have been described, it is understood that the present invention should not be limited to these embodiments. Various changes and modifications can be made by one ordinary skilled in the art within the spirit and scope of the present invention as hereinafter claimed.

What is claimed is:

1. A display apparatus comprising:
a first display panel including a first display area and a first non-display area, the first display area including a first pixel part and a second pixel part, the second pixel part being configured to display a first image;
a second display panel including a second display area and a second non-display area, the second display area including a third pixel part and a fourth pixel part, the fourth pixel part being configured to display a second image; and
an optical member including a first set of optical units and a second set of optical units, the first set of optical units being connected to the second set of optical units, the first set of optical units being connected to the second pixel part for displaying a third image, the third image corresponding to the first image, the second set of optical units being connected to the fourth pixel part for displaying a fourth image, the fourth image corresponding to the second image,
wherein the first pixel part includes a first plurality of pixels,
wherein the second pixel part includes a second plurality of pixels, and
wherein each pixel of the first plurality of pixels is larger than a pixel of the second plurality of pixels.

2. The display apparatus of claim 1, wherein the third image is a widened version of the first image.

3. The display apparatus of claim 1,
wherein the second pixel part includes a plurality of pixels, and
wherein each optical unit of the first set of optical units is connected to one pixel of the plurality of pixels for displaying an image portion corresponding to the one pixel of the plurality of pixels.

4. The display apparatus of claim 1, wherein the second pixel part and the fourth pixel part are disposed between the first pixel part and the third pixel part.

5. The display apparatus of claim 1, wherein the first non-display area and the second non-display area are disposed between the second pixel part and the fourth pixel part.

6. The display apparatus of claim 1, wherein the second pixel part is disposed between the first pixel part and the first non-display area.

7. The display apparatus of claim 1, wherein the first set of optical units overlaps both the second pixel part and the first non-display area.

8. The display area of claim 1,
wherein the first set of optical units includes a first optical unit and a second optical unit,
wherein the first optical unit is disclosed closer to the first pixel part than the second optical unit, and
wherein the first optical unit is shorter than the second optical unit.

9. The display area of claim 8,
wherein the first optical unit overlaps the second pixel part without overlapping the first non-display area, and
wherein the second optical unit overlaps both the second pixel part and the first non-display area.

10. The display area of claim 8, wherein the first optical unit includes a first end surface and a second end surface, the first end surface being substantially parallel to a display surface of the first display area, the second end surface being disposed at a first acute angle with respect to the display surface of the first display area.

11. The display area of claim 10, wherein the first optical unit further includes a reflecting surface connected to both the first end surface and the second end surface.

12. The display area of claim 10,
wherein the second optical unit includes a third end surface and a fourth end surface, the third end surface being substantially parallel to the display surface of the first display area, the fourth end surface being disposed at a second acute angle with respect to the display surface of the first display area, and wherein the second acute angle is smaller than the first acute angle.

13. The display area of claim 12, wherein an area of the first end surface is equal to an area of the third end surface.

14. The display area of claim 12, wherein the second end surface is smaller than the fourth end surface.

15. The display apparatus of claim 1,
wherein the second pixel part includes a plurality of pixels,
wherein each optical unit of the first set of optical units includes an end surface that corresponds to one pixel of the plurality of pixels, and
wherein a size of the end surface is substantially equal to a size of each pixel of the plurality of pixels.

16. The display apparatus of claim 1, wherein the first set of optical units includes at least one of a plurality of optical fibers and a plurality of optical sheets.

17. A display apparatus comprising:
a first display panel including a first display area and a first non-display area, the first display area including a first pixel part and a second pixel part, the second pixel part being configured to display a first image;
a second display panel including a second display area and a second non-display area, the second display area including a third pixel part and a fourth pixel part, the fourth pixel part being configured to display a second image; and
an optical member including a first set of optical units and a second set of optical units, the first set of optical units being connected to the second set of optical units, the first set of optical units being connected to the second pixel part for displaying a third image, the third image corresponding to the first image, the second set of optical units being connected to the fourth pixel part for displaying a fourth image, the fourth image corresponding to the second image,
wherein the optical member is an optical fiber bundle including a plurality of optical fibers, and
wherein each of the optical fibers includes a first end portion and a second end portion, the first end portion being connected to the second pixel part or the fourth pixel part, the second end portions of the optical fibers being disposed along a curved surface.

18. The display apparatus of claim 17, wherein a space between the optical member and the first and second non-display areas has a semi-circular column shape or a semi-elliptical column shape.

* * * * *